(12) United States Patent
Stuart et al.

(10) Patent No.: US 12,012,138 B2
(45) Date of Patent: *Jun. 18, 2024

(54) TECHNOLOGIES FOR CADDY ASSEMBLIES

(71) Applicant: Deflecto, LLC, Indianapolis, IN (US)

(72) Inventors: Christopher Stuart, Noblesville, IN (US); Danielle N. Rodgers, Indianapolis, IN (US); James DeChant, Carmel, IN (US); Patrick Foley, Fishers, IN (US); Cyril Bennett, Indianapolis, IN (US); Robin Wang, Foshan (CN)

(73) Assignee: Deflecto, LLC, Indianapolis, IN (US)

( * ) Notice: Subject to any disclaimer, the term of this patent is extended or adjusted under 35 U.S.C. 154(b) by 518 days.

This patent is subject to a terminal disclaimer.

(21) Appl. No.: 17/345,784

(22) Filed: Jun. 11, 2021

(65) Prior Publication Data
US 2021/0300448 A1 Sep. 30, 2021

Related U.S. Application Data

(63) Continuation of application No. 16/458,854, filed on Jul. 1, 2019, now Pat. No. 11,059,504, which is a
(Continued)

(51) Int. Cl.
*B65D 21/02* (2006.01)
*B25H 3/06* (2006.01)
(Continued)

(52) U.S. Cl.
CPC ............. *B62B 3/006* (2013.01); *B25H 3/06* (2013.01); *B62B 3/002* (2013.01); *B62B 3/004* (2013.01);
(Continued)

(58) Field of Classification Search
CPC ............... B65D 25/04; B65D 25/2802; B65D 25/2811; B65D 25/282; B65D 25/2823; B65D 25/2841; B65D 25/2867; B65D 25/2888; B65D 25/32; B65D 25/325; B65D 71/0003; B65D 71/0014; B65D 21/0212; B65D 21/0226; B65D 21/02;
(Continued)

(56) References Cited

U.S. PATENT DOCUMENTS 532,324 A 1/1895 Kolb
3,333,730 A 8/1967 Zarlinski
(Continued)

FOREIGN PATENT DOCUMENTS

DE 3702061 A1 8/1987

OTHER PUBLICATIONS

European Search Report dated Jul. 25, 2018 in related Application No. 16735280.6 filed Jan. 5, 2016, 5 pages.

*Primary Examiner* — Robert Poon
(74) *Attorney, Agent, or Firm* — Barnes & Thornburg LLP

(57) ABSTRACT

A container system including a storage base that includes a frame and a partition wall dividing the frame into first and second compartments, where each of the first and second compartments includes a cavity formed therein and the partition wall is formed to include a handle, and the handle is configured to removeably couple a first and second storage base to form a storage unit.

20 Claims, 14 Drawing Sheets

Related U.S. Application Data continuation of application No. 15/661,723, filed on Jul. 27, 2017, now Pat. No. 10,343,702, which is a continuation-in-part of application No. 14/987,483, filed on Jan. 4, 2016, now Pat. No. 10,308,409.

(60) Provisional application No. 62/369,661, filed on Aug. 1, 2016, provisional application No. 62/099,877, filed on Jan. 5, 2015.

(51) Int. Cl.
  *B62B 3/00* (2006.01)
  *B62B 3/04* (2006.01)
  *B62B 5/06* (2006.01)
  *B65D 71/52* (2006.01)

(52) U.S. Cl.
  CPC .............. *B62B 3/04* (2013.01); *B62B 5/06* (2013.01); *B65D 21/0212* (2013.01); *B65D 71/0003* (2013.01)

(58) Field of Classification Search
  CPC ........... B65D 21/0204; B65D 21/0209; B65D 21/06; B65D 21/062; B65D 21/066; B65D 1/36; B65D 5/46; B65D 5/46008; B65D 5/46016; B65D 5/46024; B65D 5/4604; B65D 23/108; A45C 11/20; A45C 1/28; A45C 1/26
  USPC ................................. 220/554; 206/503, 510
  See application file for complete search history.

(56) References Cited

U.S. PATENT DOCUMENTS

| | | |
|---|---|---|
| 3,349,958 A | 10/1967 | Breneman |
| 4,109,926 A | 8/1978 | Lane |
| 4,364,150 A | 12/1982 | Remington |
| 4,505,506 A | 3/1985 | Picozza |
| 4,714,158 A | 12/1987 | Oltman et al. |
| 5,415,277 A | 5/1995 | Berntsen |
| 5,423,445 A * | 6/1995 | Montanari ............ B65D 25/22 206/506 |
| 5,609,282 A | 3/1997 | Melanson |
| 5,904,388 A | 5/1999 | Seibel |
| 6,059,109 A | 5/2000 | Stein |
| 6,607,199 B2 | 8/2003 | Gruber |
| 7,559,514 B1 | 7/2009 | Wynter |
| 8,636,169 B2 | 1/2014 | Sampaio |
| 8,979,098 B2 * | 3/2015 | Wang ..................... B62B 3/022 280/651 |
| 9,969,526 B1 | 5/2018 | Lowther et al. |
| 10,308,409 B2 | 6/2019 | Stuart et al. |
| 10,343,702 B2 | 7/2019 | Stuart et al. |
| 11,059,504 B2 | 7/2021 | Stuart et al. |
| 2002/0179462 A1 | 12/2002 | Silvers |
| 2005/0247588 A1 | 11/2005 | Hedges |
| 2006/0144732 A1 | 7/2006 | Kaplan et al. |
| 2006/0157373 A1 * | 7/2006 | Griffith ............. B65D 21/0209 206/510 |
| 2006/0272556 A1 | 12/2006 | Apps |
| 2008/0000899 A1 | 1/2008 | Baker et al. |
| 2009/0255092 A1 | 10/2009 | Huang et al. |
| 2010/0176022 A1 | 7/2010 | Furlong |
| 2011/0005433 A1 | 1/2011 | Pichereau |
| 2011/0061572 A1 | 3/2011 | Liu et al. |
| 2013/0021787 A1 | 1/2013 | Noble |
| 2014/0311926 A1 | 10/2014 | Walters et al. |
| 2014/0319302 A1 | 10/2014 | Baltz |
| 2015/0021322 A1 | 1/2015 | Rosenblum |
| 2015/0047939 A1 * | 2/2015 | Chang ................... F16M 11/28 190/102 |
| 2015/0210426 A1 | 7/2015 | Funaki |
| 2016/0130034 A1 * | 5/2016 | Kuhls ................. B65D 21/023 206/510 |
| 2016/0264292 A1 | 9/2016 | Schoening |
| 2017/0190465 A1 | 7/2017 | Nussbaum et al. |

* cited by examiner

TECHNOLOGIES FOR CADDY ASSEMBLIES

RELATED APPLICATION DATA

This application is a continuation of U.S. patent application Ser. No. 16/458,854, filed on Jul. 1, 2019, which claims the benefit of U.S. patent application Ser. No. 15/661,723, filed on Jul. 27, 2017, now U.S. Pat. No. 10,343,702, which claims the benefit of U.S. Provisional Pat. Application No. 62/369,661 filed Aug. 1, 2016, and U.S. patent application Ser. No. 15/661,723 is also a continuation-in-part of U.S. patent application Ser. No. 14/987,483, filed Jan. 4, 2016, now U.S. Pat. No. 10,308,409, which claims the benefit of U.S. Provisional Pat. Application No. 62/099,877, filed Jan. 5, 2015; the disclosures of all of the foregoing being hereby expressly incorporated by reference herein.

FIELD OF DISCLOSURE

The present disclosure relates to a container system that includes a portable carrying base configured to receive interchangeable storage receptacles. One or more individual container systems can be combined to create a larger organizational unit.

BACKGROUND

Storing items such as office or craft supply items can be difficult with current storage systems. This is because known storage solutions do not offer the flexibility to interchange storage receptacles or easily stack and carry more than one storage solution.

SUMMARY

The present disclosure includes one, or more of the features recited in the appended claims and/or the following features which, alone or in any combination, may comprise patentable subject matter.

According to a first aspect of the present disclosure, a storage system includes a storage base. The storage base comprises a frame including a first horizontal side wall facing a second horizontal side wall and a first horizontal end wall facing a second horizontal end wall. The first horizontal end wall and the second horizontal end wall extend transversely between the first horizontal side wall and the second horizontal side wall. The storage base further includes a partition wall extending transversely between the first horizontal end wall and the second horizontal end wall to divide the frame into a first compartment and a second compartment. Each of the first compartment and the second compartment includes a planar bottom, a first vertical side wall coupled to and extending away from the planar bottom and terminating at a first top edge, the first top edge coupled to the first horizontal end wall, and a second vertical side wall facing the first vertical side wall and coupled to and extending way from the planar bottom and terminating at a second top edge. The second top edge coupled to the second horizontal end wall. The storage base further includes an at least one cavity formed by the interaction of the planar bottom, the first vertical side wall, and the second vertical side wall of each of the first compartment and the second compartment. Each of the at least one cavities formed to include an open top bounded by the first top edge of the first horizontal end wall, the second top edge of the second horizontal wall, the partition wall, and one of the first horizontal side wall or the second horizontal side wall. The partition wall is formed to include an upper portion extending above the frame to form a handle, the handle formed to include a first handle portion pivotally coupled to a first end of the handle, a second handle portion pivotally coupled to a second end of the handle, and a groove formed to receive the first handle portion and the second handle portion therein. Each of the first horizontal end wall and the second horizontal end wall includes an opening and each of the first handle portion and the second handle portion has a projecting edge configured to mate with the opening formed in each of the first horizontal end wall and the second horizontal end wall. The storage base further comprises a first storage base and a second storage base. The first handle portion and the second handle portion of the first storage base are configured to couple with a corresponding opening formed within each off the first horizontal end wall and the second horizontal end wall of the second storage base to removeably couple the first storage base to the second storage base to create a storage unit.

In some embodiments, the container system further comprises a removable receptacle configured to be received within at least a portion of each of the cavities. The removable receptacle comprises a planar bottom having a pair of side walls coupled thereto and an outward peripheral edge, the outward peripheral edge having a rectangular shape and a cap having the same shape as the planar bottom and configured to be received by the first top edge and the second top edge of the first side wall and the second side wall to form an enclosed receptacle. The planar bottom includes a lower surface formed to include a recessed portion, an upper surface formed to include an at least one raised portion configured to mate with the recessed portion of the lower surface, and a receptacle connection structure formed by the recessed portion and the at least one raised portion and configured to removeably couple the removable receptacle to the planar bottom.

In other embodiments, the planar bottom includes at least three receptacle connection structures positioned at evenly spaced intervals across the planar bottom.

In some embodiments, the cap includes a cap upper surface formed to include an at least one cap recessed portion and a cap receptacle connection structure formed by the at least one cap recessed portion formed in the cap upper surface and configured to removeably couple to an at least one cap raised portion formed in the lower surface of the planar bottom to removeably couple the cap to the planar bottom.

In other embodiments, the cap further includes a pair of planar bottom connection structures positioned at evenly spaced intervals across the cap upper surface.

In some embodiments, the cap further includes an at least three planar bottom connection structures positioned at evenly spaced intervals across the cap upper surface.

In other embodiments, the container system further includes a first storage base and a second storage base. The first handle portion and the second handle portion of the first storage base are configured to couple with the corresponding opening formed in each of the first horizontal end wall of the first storage base and the second horizontal end wall of the second storage base to removeably couple the first storage base to the second storage base. The cap of the enclosed receptacle of the lower storage base is configured to couple with the lower surface of the planar bottom of the second storage unit such that first storage base and the second storage base form a storage unit.

In other embodiments, the first compartment and the second compartment are formed to receive a handle of a second storage base when the second storage base is coupled to the first storage base.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
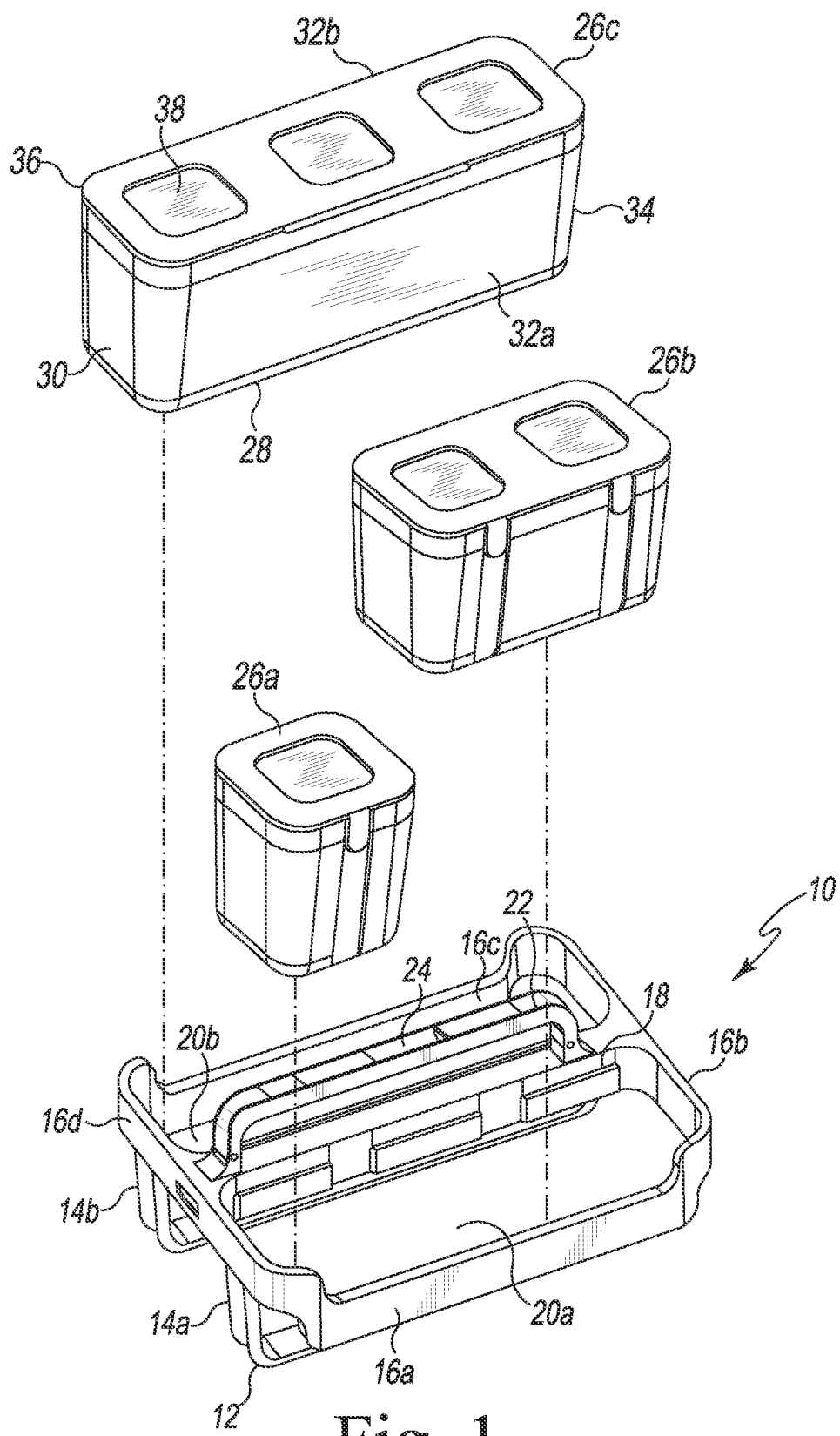
FIG. 1 depicts an exploded view of a carrying base and storage receptacles according to an embodiment of the disclosure.

As shown in FIG. 1, the container system includes a base portion 10. The base portion includes a planar bottom 12. The base portion includes a first end and a second end, each of which are coupled to a vertical side wall 14a and 14b. The vertical side wall 14 is coupled to horizontal side walls 16a, 16b, 16c and 16d, which define the internal space of the base portion 10. The base portion can assume various shapes known to persons of ordinary skill in the art by varying the length or other dimensions of the horizontal and vertical side walls, but is preferably square or rectangular in shape.

Further, as shown in FIG. 1, an interior horizontal sidewall 18 or sidewalls may be used to separate or divide the interior of the base portion into one or more cavities 20. In the embodiment shown in FIG. 1, the base portion is divided into two cavities 20a and 20b. Each cavity is defined by a planar bottom 12, vertical side walls 14 and a horizontal interior side wall 16. The planar bottom 12, vertical side walls 14 and horizontal side walls 16 and 18 can vary in dimension so as to create a more open base portion as shown or closed cavity. In other embodiments, the cavities can further be defined into smaller cavities by employing additional interiors side walls within the cavity.

A handle 22 extends from a first horizontal side wall to second horizontal side wall opposite to or facing the first horizontal sidewall. The handle is provided to allow the container system to be moved to another location by grasping a portion of the bar 24. As discussed in more detail later on, the handle portion 44 also serves to connect one container system to another.

The container system also includes one or more receptacles 26 of the same or varying sizes like those shown in 26a, 26b and 26c. The receptacles can be inserted within the base portion to transport the receptacles or store the receptacles. The receptacles can also be removed to access items within the receptacle or interchange them with a different receptacle. Each receptacle includes a planar bottom 28 with walls coupled to outward peripheral edges of the planar bottom 28. Specifically, the receptacle may include a first side wall 32a that is coupled to one side edge of the planar bottom 28 and a second side wall 32b is coupled to the opposite side edge of the planar bottom. Between the sidewalls is a frontwall 30 that is coupled to a front edge of the planar bottom and a backwall 34 coupled to the opposite back edge of the planar bottom. The sidewalls, planar bottom and front and back walls combine to form a receptacle with an internal storage cavity.

Included with the receptacle 26 is a cap 36 which can be attached to an upper edge of a side wall, front wall or back wall to create an enclosed receptacle. For example, the cap can be provided with one or more hinge supports equally spaced along a peripheral edge of the cap which is joined to either a side wall, front wall or back wall. In the embodiment, the cap can open by pivoting about the hinge and close by pivoting about the hinge in an opposite direction. The cap can also snap into place on top of the receptacle. Other mechanisms of attaching the cap to the receptacle well known to those of ordinary skill in the art can also be employed. Further, the upper surface of the cap 36 may include one or more recesses 38 which have a peripheral profile that corresponds to all or a portion of the planar bottom 12 of the base portion 10, the planar bottom 28 of a different receptacle, or both such that when one or more organization units are vertically stacked, the planar bottom 12 of the base portion 10, the planar bottom 28 of a different receptacle, or both nest with in all or a portion of the cap recess.

Figure 2:
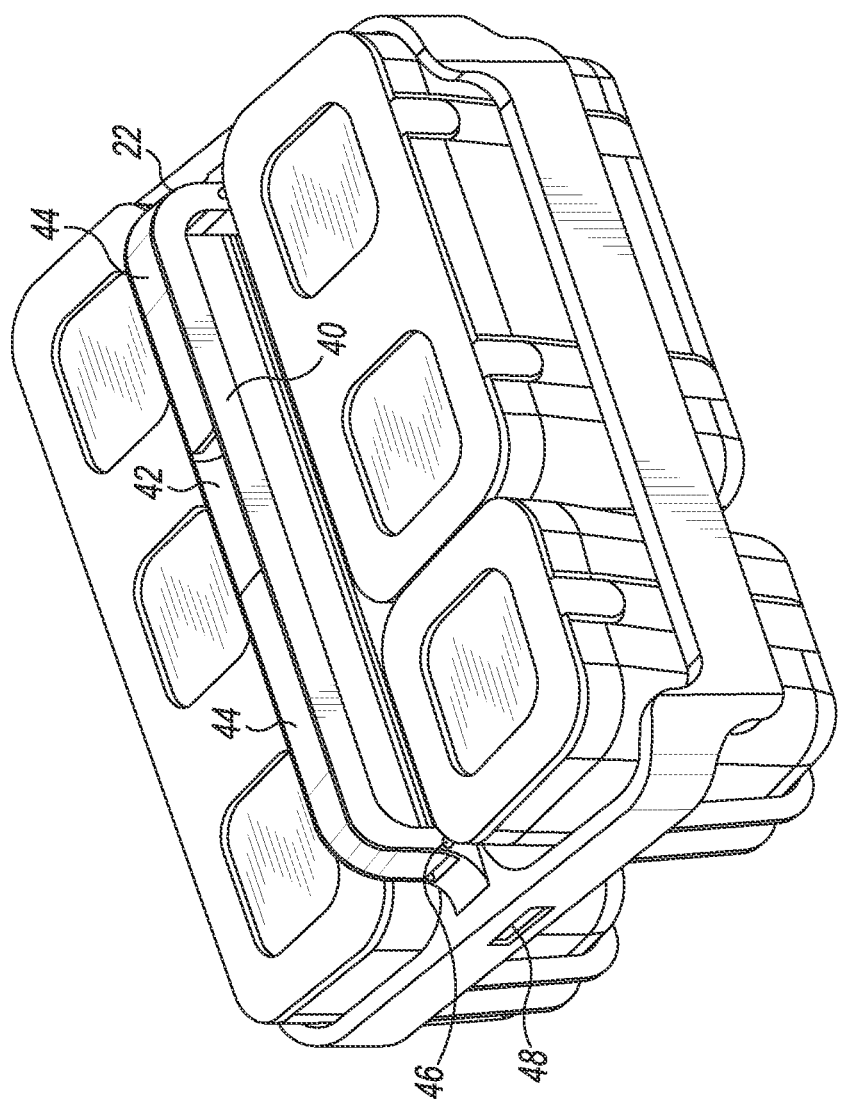
FIG. 2 depicts a view of a carrying base and storage receptacles according to an embodiment of the disclosure.

FIG. 2 is shows a more detailed view of the handle 22. The handle 22 may include a pair of handle side walls 40 facing each other forming a groove or open cavity 42 which can receive handle portion 44 that pivots about a fixed point 46 to a 90 degree or substantially 90 degree angle with respect to the handle 22. The handle portion 44 and the groove 42 are configured such that the upper surface of handle portion 44 is flush with the upper edges of the groove 42 when the handle portion is received within the groove. FIG. 2 also shows an opening 48 in horizontal side wall, which is adapted to receive the upper part of the handle portion as shown in FIGS. 3 and 4.

Figure 3:
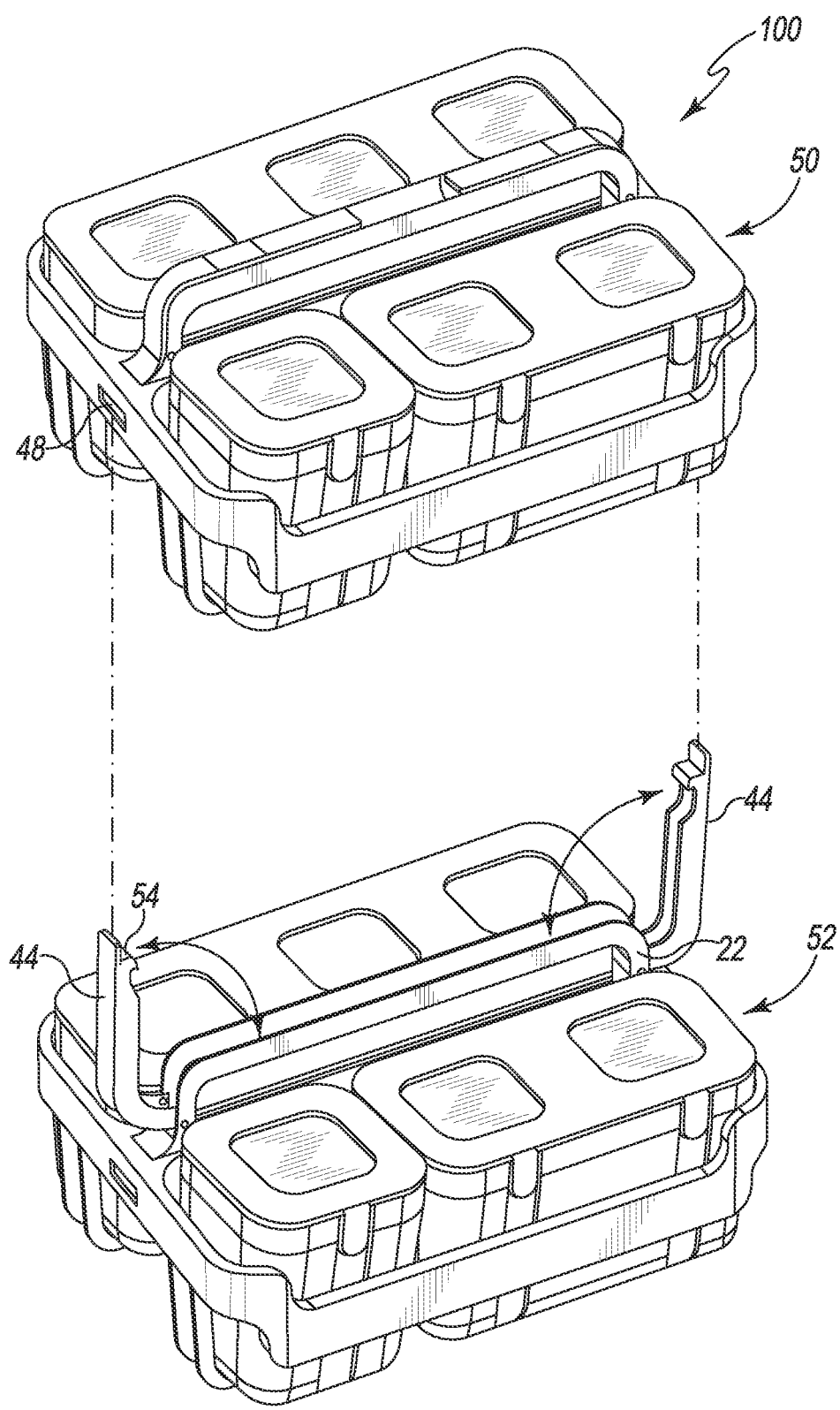
FIG. 3 depicts an exploded view of the organizational unit according to an embodiment of the disclosure.
Figure 4:
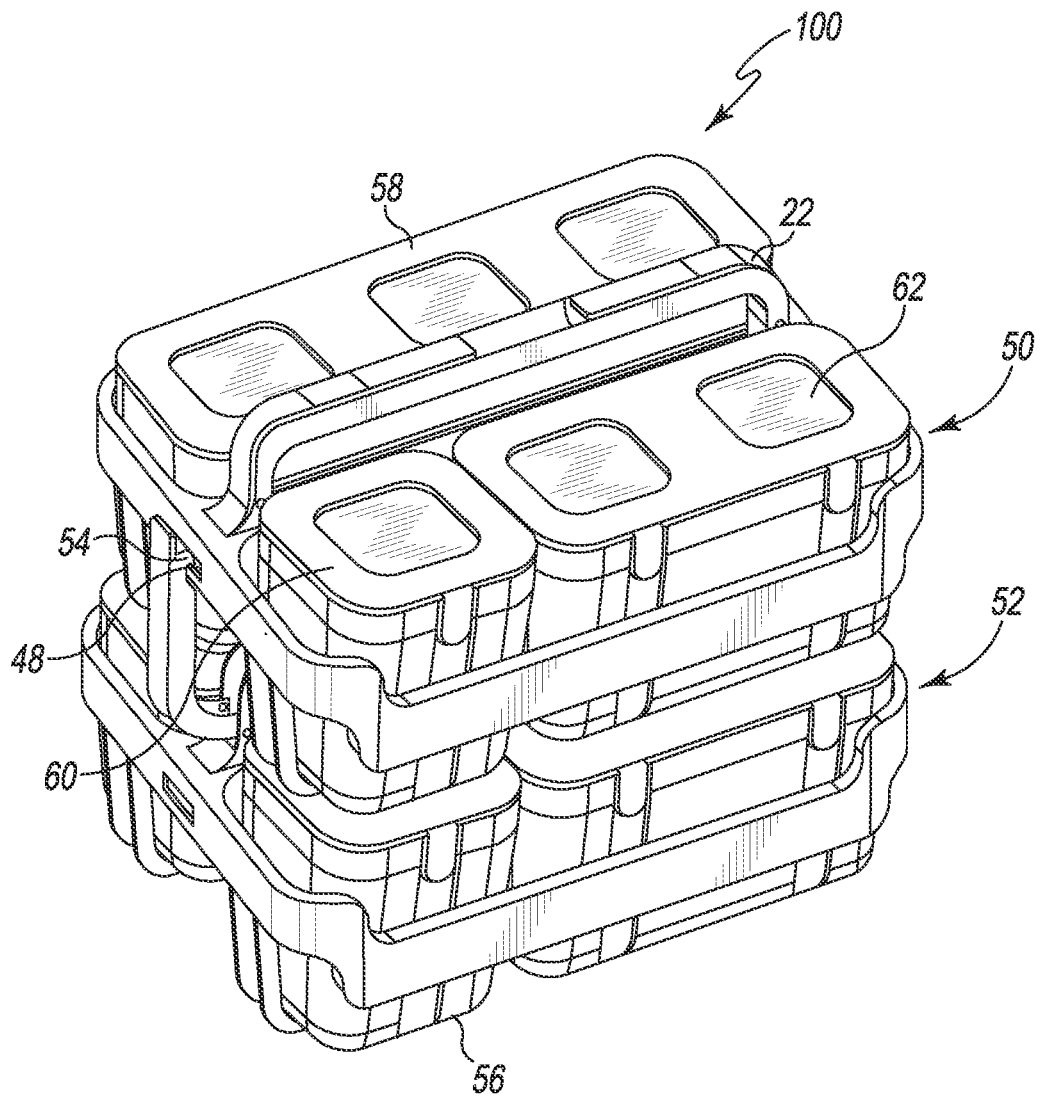
FIG. 4. depicts the organizational unit according to an embodiment of the disclosure.

FIGS. 3 and 4 show an embodiment of the disclosure where two or more container systems may be connected to each other to create an organization unit 100. Specifically, FIG. 3 shows an upper container system 50 disconnected from a lower container system 52 which allows a user to create a smaller organizational unit or to access receptacles within a lower container system 52.

In this embodiment, the handle portions 44 are extended outwardly from the handle 22 at about 90 degrees. Each handle portion has a projecting edge 54 which can be mated with the opening 48 within the horizontal side wall of the upper container system 50. When the projecting edges 54 are mated with a corresponding opening 48 of the upper container system, the container systems are securely connected and transportable using the handle of the upper container system 22 while the planar bottom 56 of the lower container system 52 serves as the base of the entire organizational unit. A person of ordinary skill in the art would understand that the organizational unit is not limited to only two container systems mated together and that two or more container systems can be mated together in order to create a large organizational unit. In this case, the handle 22 of the upper most container system permits a user to easily transport or carry the entire organizational unit while the planar bottom of the lower most container system serves as the base for the entire organizational unit.

Figure 5:
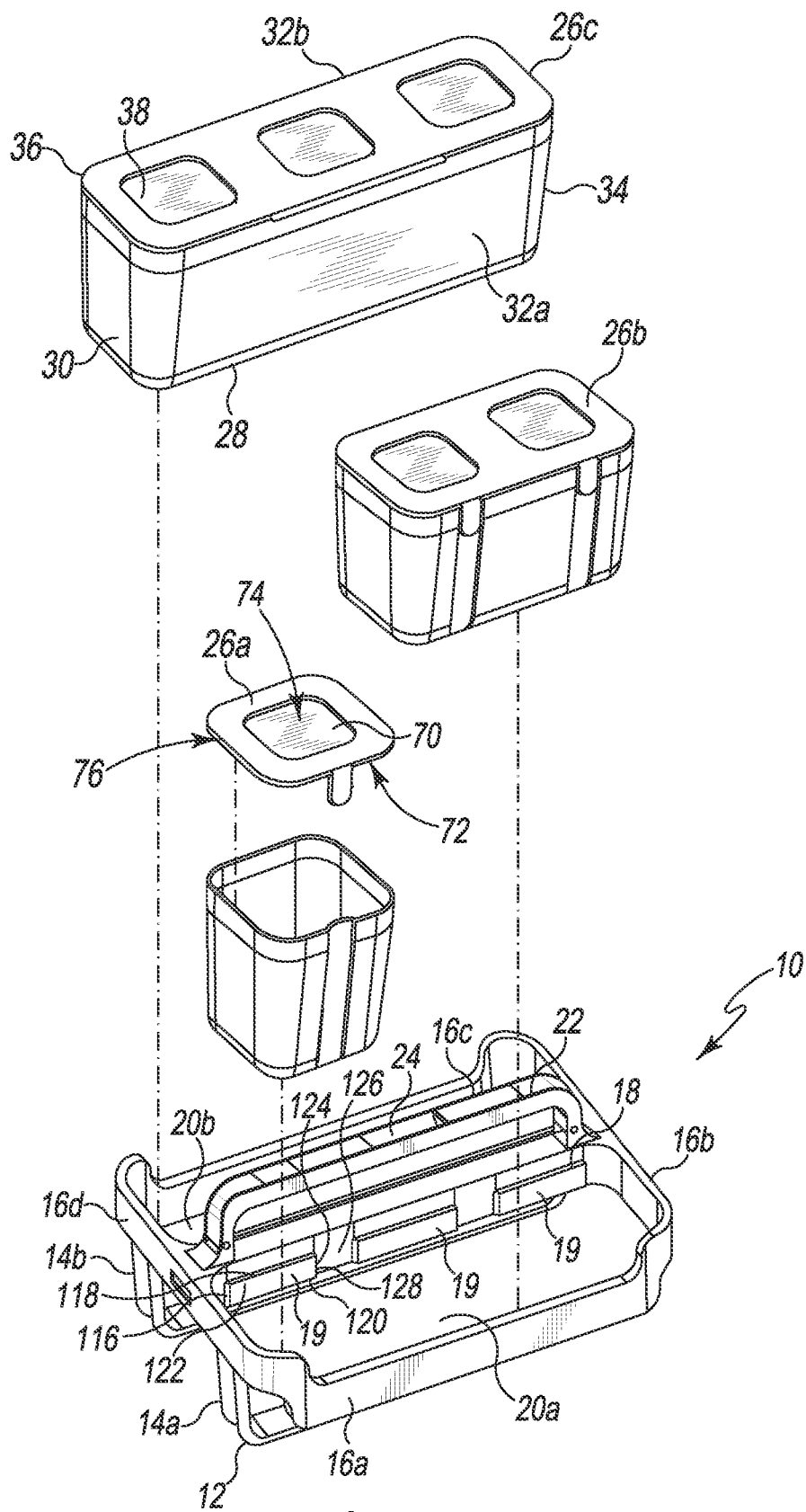
FIG. 5 depicts an exploded view of the organizational unit according to an embodiment of the disclosure.

As shown in FIG. 5 the container system includes a base portion 10. The base portion includes a planar bottom 12. The base portion includes a first end and a second end, each of which are coupled to a vertical side wall 14a and 14b. The vertical side wall 14 is coupled to horizontal side walls 16a, 16b, 16c and 16d, which define the internal space of the base portion 10. The base portion can assume various shapes known to persons of ordinary skill in the art by varying the length or other dimensions of the horizontal and vertical side walls, but is preferably square or rectangular in shape.

Further, as shown in FIG. 5, an interior horizontal sidewall 18 or sidewalls may be used to separate or divide the interior of the base portion into one or more cavities 20. In the embodiment shown in FIG. 1, the base portion is divided into two cavities 20a and 20b. Each cavity is defined by a planar bottom 12, vertical side walls 14 and a horizontal interior side wall 16. The planar bottom 12, vertical side walls 14 and horizontal side walls 16 and 18 can vary in dimension so as to create a more open base portion as shown or closed cavity. In other embodiments, the cavities can further be defined into smaller cavities by employing additional interiors side walls within the cavity.

A handle 22 extends from a first horizontal side wall to second horizontal side wall opposite to or facing the first horizontal sidewall. The handle is provided to allow the container system to be moved to another location by grasping a portion of the bar 24. As discussed in more detail later on, the handle portion 44 also serves to connect one container system to another.

The container system also includes one or more receptacles 26 of the same or varying sizes like those shown in 26a, 26b and 26c. The receptacles can be inserted within the base portion to transport the receptacles or store the receptacles. The receptacles can also be removed to access items within the receptacle or interchange them with a different receptacle. Each receptacle includes a planar bottom 28 with walls coupled to outward peripheral edges of the planar bottom 28. Specifically, the receptacle may include a first side wall 32a that is coupled to one side edge of the planar bottom 28 and a second side wall 32b is coupled to the opposite side edge of the planar bottom. Between the sidewalls is a frontwall 30 that is coupled to a front edge of the planar bottom and a backwall 34 coupled to the opposite back edge of the planar bottom. The sidewalls, planar bottom and front and back walls combine to form a receptacle with an internal storage cavity.

Included with the receptacle 26 is a cap 36 which can be attached to an upper edge of a side wall, front wall or back wall to create an enclosed receptacle. In an embodiment, the cap 36 is configured to cover and seal the opening of the receptacle 26. The cap 36 includes a panel 70 with an upper surface 74 and a lower surface 72. An edge circumvents 76 the perimeter of the panel. In an embodiment, the edge 76 has an inner wall that extends perpendicularly or substantially perpendicular downward from the plane of the panel. The inner wall is coupled to an upper wall of the edge which extends horizontally and is coupled to an outer wall that extends vertically downward from the upper wall. The outer wall is spaced apart from the inner wall to form a channel (not shown). In an example, the cap fits over the receptacle so that the top edge of the receptacle is received within the channel of the lid. In this example, the cap covers the opening of the receptacle create a closed cavity. Further to this example, the cap can easily be removed to access the cavity within the receptacle. Other mechanisms of attaching the cap to the receptacle well known to those of ordinary skill in the art can also be employed. Further, the upper surface of the cap 36 may include one or more recesses 38 which have a peripheral profile that corresponds to all or a portion of the planar bottom 12 of the base portion 10, the planar bottom 28 of a different receptacle, or both such that when one or more organization units are vertically stacked, the planar bottom 12 of the base portion 10, the planar bottom 28 of a different receptacle, or both nest with in all or a portion of the cap recess.

Further, a person of ordinary skill in the art would understand that a kit could be created using various combinations of the components described above. For example a kit could include a base portion with three different sized receptacles 58, 60 and 62 that fit within the base unit cavities. Separate base units could be provided such that the combination of receptacles could vary. For example, three smaller receptacles may be placed within one cavity of the base portion, or each base portion could include only one receptacle that extends the entire length and width of the cavity, 62.

Figure 6A:
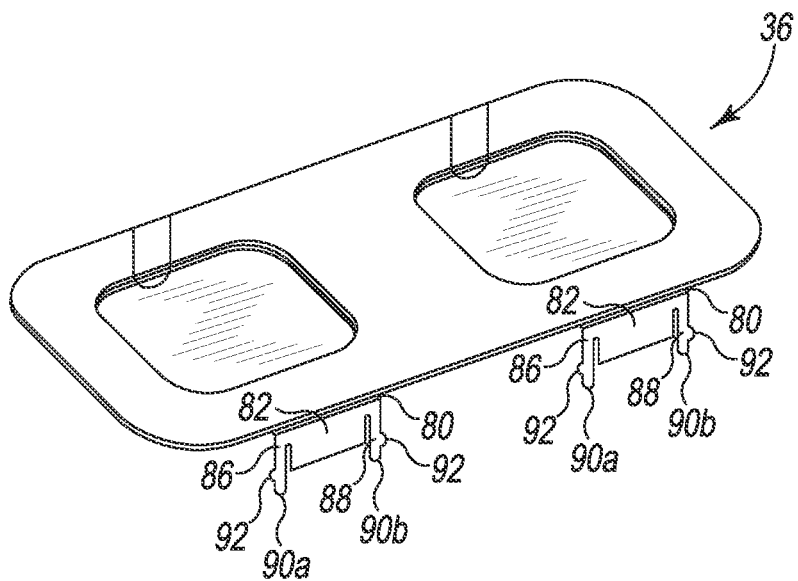
FIGS. 6A-6C depict a view of the storage receptacles and lid according to an embodiment of the disclosure.
Figure 6B:
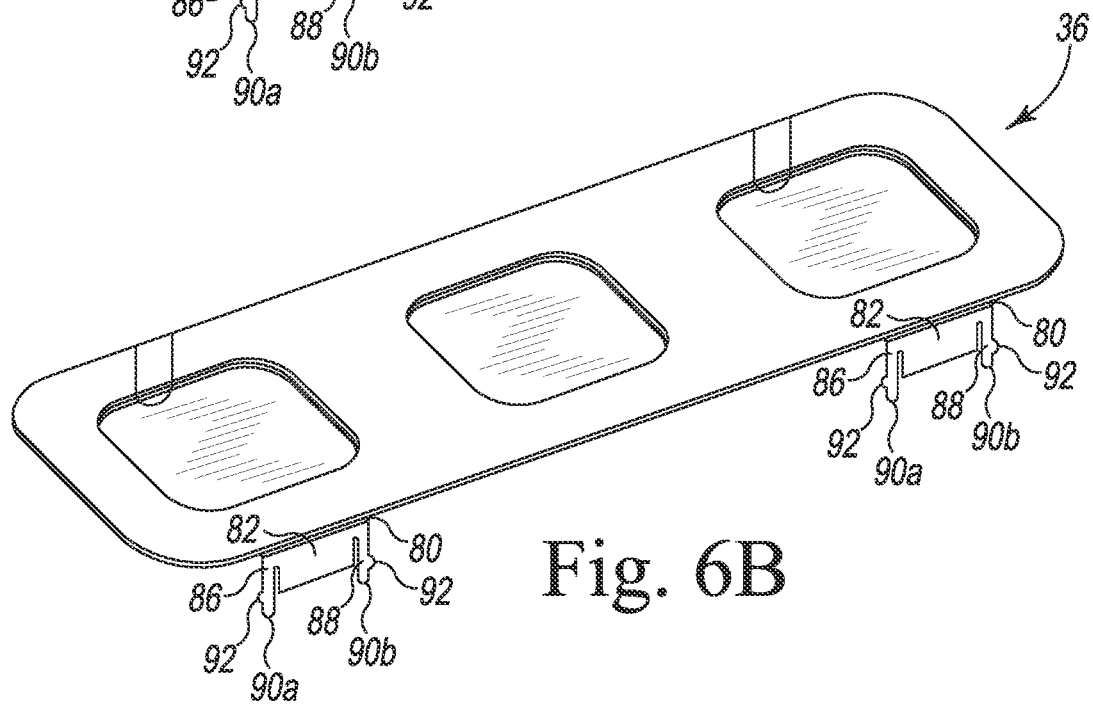
Figure 6C:
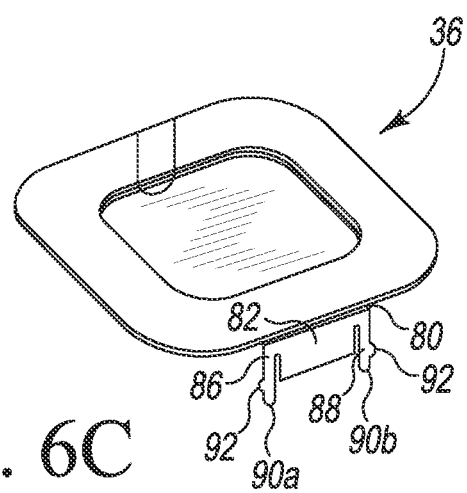

Another embodiment of the cap 36 is shown in FIGS. 6A-6C. In this embodiment, the cap 36 is removeably attached to an upper edge of a side wall, front wall or back wall of the receptacle to create an enclosed receptacle. In this embodiment, the cap can be provided with one or more hinge supports 80 equally spaced along a peripheral edge of the cap. In an example the hinge includes a flap 82 configured to be received by a slot 84 (show in FIG. 7) on a sidewall 32 of the receptacle. In an embodiment, the flap 82 includes a first tab 86 opposed to a second tab 88 each of which extend outwardly and downwardly from the flap 82. The position of each tab relative to the slot 84 is configured to provide sufficient clearance to span the width of the slot 86 and in operation allow the tabs 86 and 88 to be squeezed inwards, e.g. towards the center of the flap 82 to engage the flap 82 with the slot 84. In operation, the tabs 86 and 88 can be squeezed inwards, e.g. towards the center of the flap 82 to disengage the flap 82 from the slot 84.

In an embodiment, the flap 82 and tabs 86 and 88 are integrally formed, e.g. by injection molding. The material composition and dimensions of the tabs 86 and 88 are configured that in operation, a user can laterally displace the tabs with respect to the flap 82 with moderate force and to allow the tabs 86 and 88 to return back to their original position when then force has been released. In an example the flap and tabs are composed of a resilient material such as a plastic or resilient metal.

Figure 7:
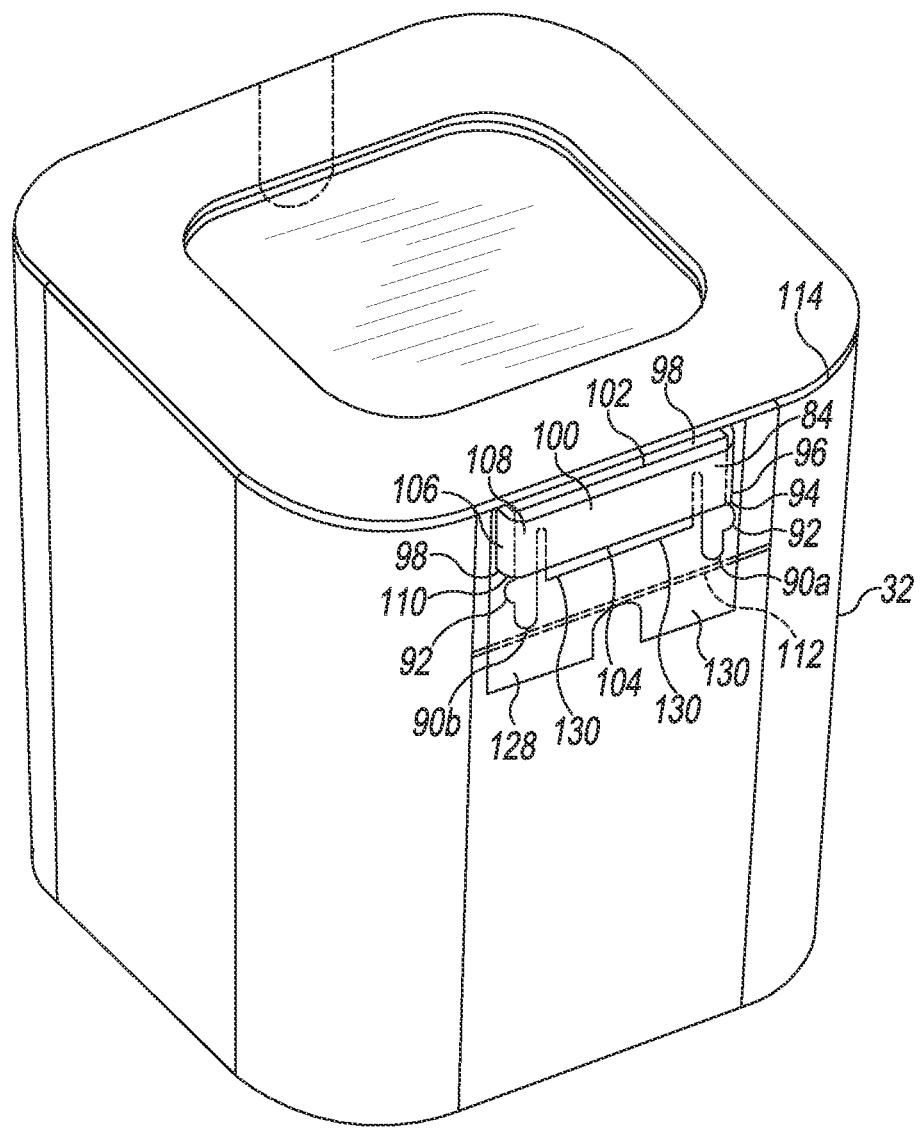
FIG. 7 depicts a view of the storage receptacle and lid according to an embodiment of the disclosure.

In an embodiment, each tab 86 and 88 has an end portion 90 that extends downwardly from each tab. In operation, as shown in FIG. 7, when each tab 86 and 88 is received within the slot 84, the end portion 90 extends past the lower edge 94 of the slot 84. In an embodiment, each tab 86 and 88 include a protrusion 92 that extends outwardly and horizontally from a peripheral edge of the tab. The position of each tab 86 and 88 and its respective protrusion 92 relative to the slot 84 are configured to provide sufficient clearance to span the width of the slot 86 and in operation allow the tabs 86 and 88 to be squeezed inwards, e.g. towards the center of the flap 82 to engage the flap 82 with the slot 84.

In an example, the material composition and dimensions of the tabs 86 and 88 are configured such that in operation, a user can laterally displace the tabs with respect to the flap 82 with moderate force and to allow the tabs 86 and 88 to return back to their original position when the force has been released. In this embodiment, each protrusion clears the lower edge 94 of the slot 84 when the tabs are squeezed inwards and when the force on the tabs is released, the tabs return to their original position such that the lower edge 94 of the slot rests on an upper edge 98 of the protrusions. In an example, the protrusion provides a locking mechanism that secures the flap and its respective tabs within the slot. In operation, when the flap and tabs are received within the slot 84, the protrusions prevent upward motion of the flap 82 and tabs 86 and 88. Further to this example, in operation, the tabs 86 and 88 can be squeezed inwards, e.g. towards the center of the flap 82 such that the tabs and protrusions are laterally displaced a dimension to have sufficient clearance of the slot to disengage the flap 82 from the slot 84.

In operation, the tabs 86 and 88 can be squeezed inwards, e.g. towards the center of the flap 82 to disengage the flap 82 from the slot 84.

As shown in FIG. 7, the receptacle can include one or more slots evenly spaced across the sidewall 32. In an embodiment, the slot 84 configured to receive the flap 82. The slot 84 includes a first slot end wall 96 extending outwardly and horizontally away from the receptacle sidewall 32 and terminating at an upper edge 98 and a lower edge 94. An edge of the first slot end wall 96 is coupled to a horizontal side wall 100 which faces the receptacle sidewall 32 and extends horizontally across the sidewall 32 and terminates at an upper edge 102 and lower edge 104. The slot sidewall coupled to a second slot end wall 106 extending outwardly and horizontally away from the receptacle sidewall 32 and terminating at an upper edge 108 and a lower edge 110. A slot or opening formed within the slot end walls and horizontal side walls has an open top bounded by the top edges of the horizontal side walls and slot end walls and an open bottom bounded by the lower edges of the horizontal side walls and slot end walls is configured with suitable dimensions to receive a tab 86.

In an embodiment, the sidewall 32 of the receptacle includes a tab 112 that extends horizontally across a portion of the receptacle sidewall 32, downwards from the upper edge 114 and outward from the sidewall 32 of the receptacle sidewall 32. The position of the receptacle tab 112 relative to the slot 19 is configured to provide sufficient clearance to span the width of the slot 19 and in operation allow the tab to be inserted within the slot 19 and removed from the slot 19.

In an embodiment, the receptacle tab 112 includes a first receptacle tab portion 128 opposed to a second receptacle tab portion 130 each of which extend outwardly and downwardly from the tab 112. The position of each tab portion relative to the slot 19 is configured to provide sufficient clearance to span the width of the slot 19 and m operation allow the tab to be removeably inserted within the slot 19.

In an embodiment, shown in FIG. 5, the partition wall includes one or more partition slots spaced evenly across the partition wall. The partition slot 19 includes a first slot end wall 116 extending outwardly horizontally away from the partition wall 18 and terminating at an upper edge 118 and a lower edge 120. An edge of the first slot end wall 116 is coupled to a horizontal side wall 122 which faces the partition wall 18 and extends horizontally across the partition wall 18 and terminates at an upper edge 118 and lower edge 120. The partition slot sidewall coupled to a second slot end wall 124 extending outwardly and horizontally away from the partition wall 18 and terminating at an upper edge 126 and a lower edge 128. A slot or opening formed within the slot end walls and horizontal side walls having an open top bounded by the top edges of the horizontal side walls and slot end walls and an open bottom bounded by the lower edges of the horizontal side walls and slot end walls is configured with suitable dimensions to receive a tab 112.

In an embodiment, the partition slot 19 has one or more interior walls that extend outward from the partition wall 18. The interior walls 130 (shown in FIG. 7) extend outward from the partition wall 18 relative to the horizontal side wall 122 to provide sufficient clearance of the tab 112 between the horizontal sidewall 122 and the interior wall. The interior walls 130 provide additional stability for the tab 112 when inserted within the partition slot 19. In an embodiment the interior walls can be further configured relative to the tab such that the spacing between the interior walls and the sidewalls or adjacent interior walls form a channel (not shown) sufficient to receive the tab 112, tab portion 128 and 130, or both.

Figure 8:
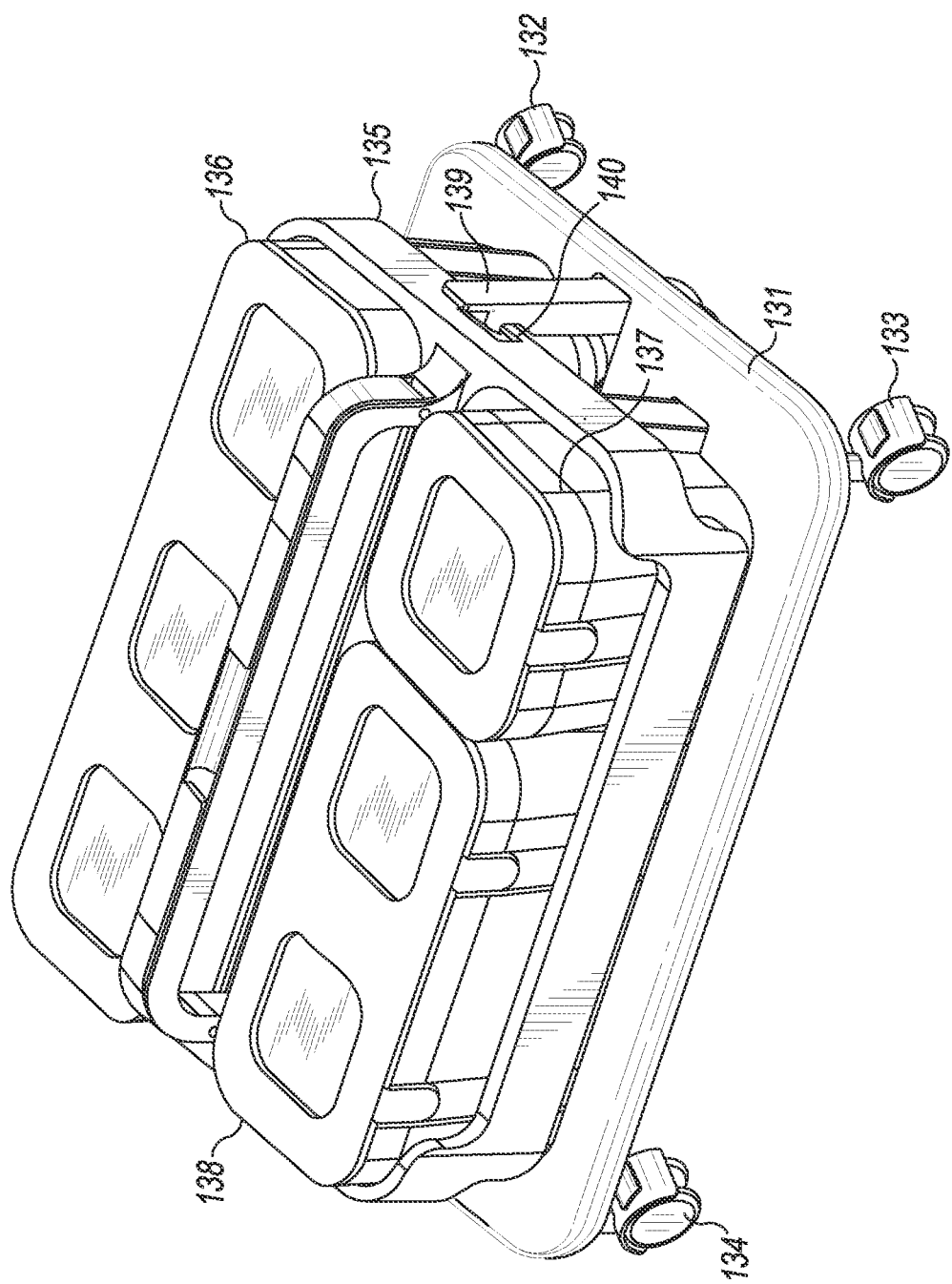
FIG. 8 is a perspective view of a platform supporting a carrying base and storage receptacles according to an embodiment of the disclosure.
Figure 11:
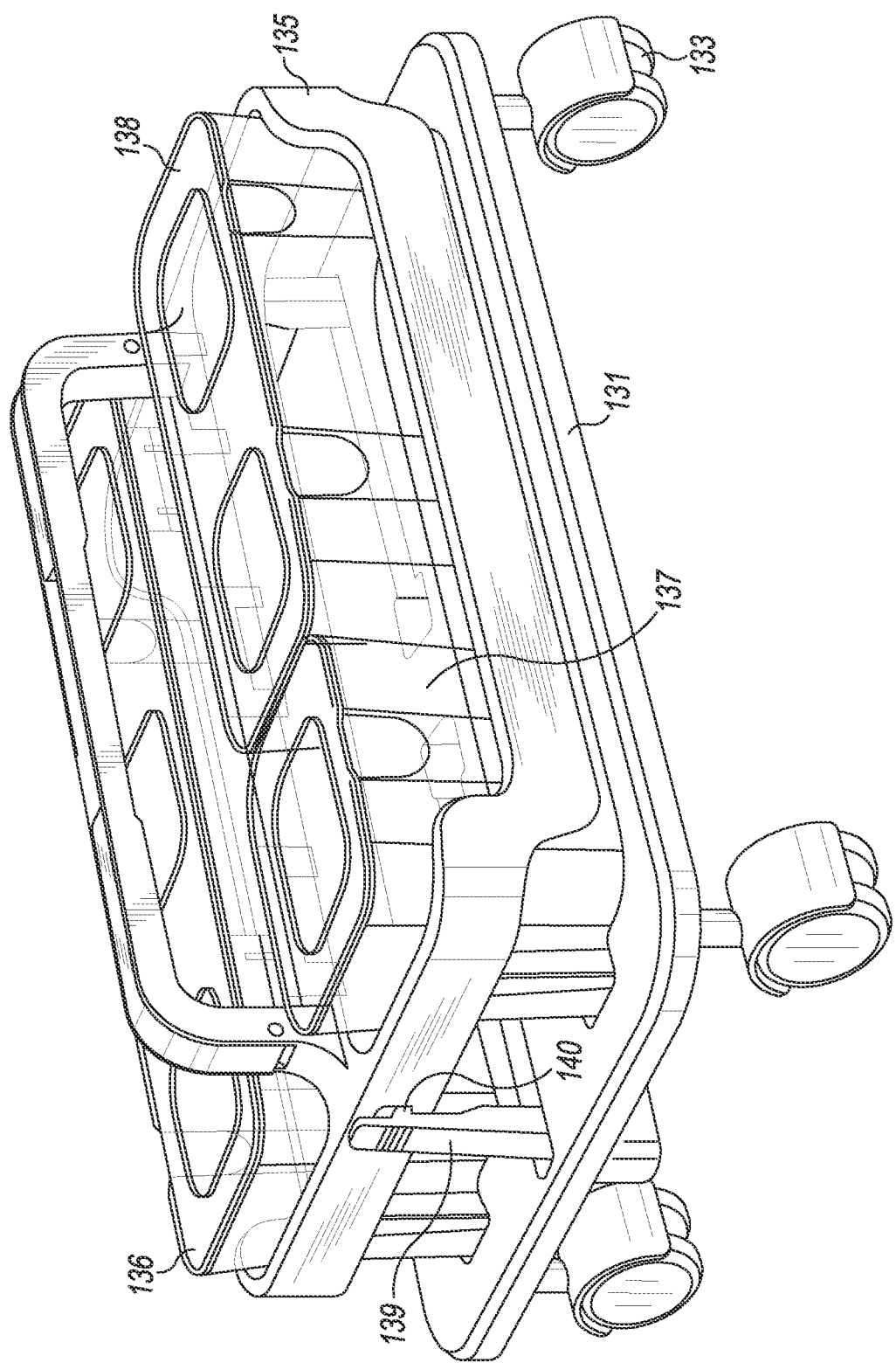
FIG. 11 is a perspective view of an embodiment of a platform supporting a storage base with a plurality of storage receptacles according to this disclosure.
Figure 14:
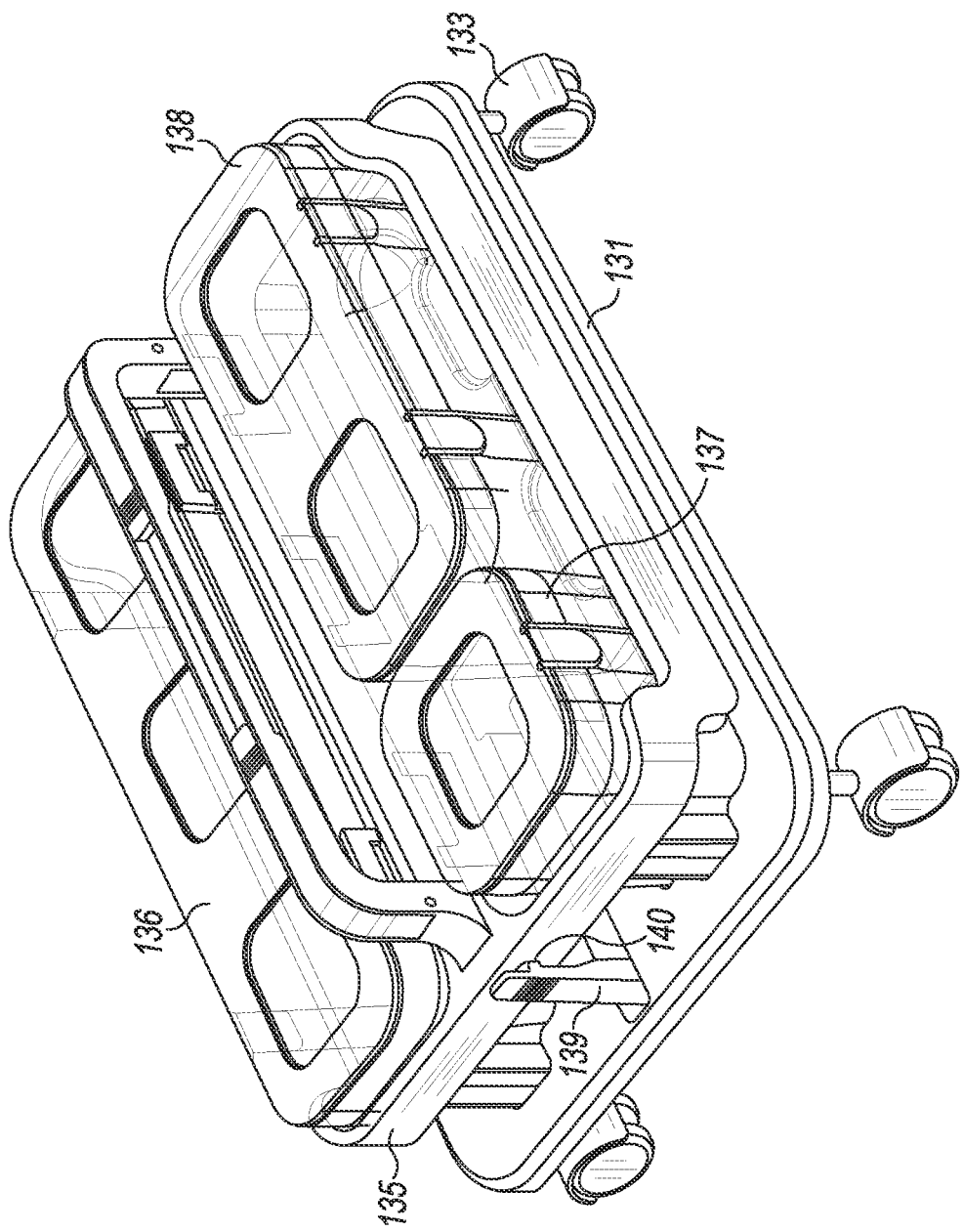
FIG. 14 is a perspective view of an embodiment of a platform supporting a storage base with a plurality of storage receptacles according to this disclosure.

Also described herein is a customizable caddy assembly that includes a platform and a storage base configured to receive interchangeable storage receptacles. FIG. 8 is a perspective view of a platform 131 according to an embodiment of the disclosure. FIG. 11 is a perspective view of an embodiment of a platform 131 supporting a storage base 135 with a plurality of storage receptacles 136, 137, 138 according to this disclosure. FIG. 14 is a perspective view of an embodiment of a platform 131 supporting a storage base 135 with a plurality of storage receptacles 136, 137, 138 according to this disclosure. Here, the platform base 131 is fitted with four removable wheels (132, 133, 134, and a fourth not shown) and supports the storage base 135. The storage base 135 in this configuration contains a single long receptacle on one side 136 and two receptacles 137 and 138 on the other side. Other configurations of the receptacles on the storage base can include six small receptacles, or four small receptacles and a medium receptacle, or three small receptacles and one large receptacle, two small receptacles and two medium receptacles, one small receptacle with a medium receptacle and a large receptacle, or two large receptacles. The platform base 131 is also equipped with means such as a tab 139 that mates with opening 140 to secure the storage base 135 to the platform 131. The tab can be similar in construction to the handle portion 44 of the storage base that serves to connect one container system to another. Each tab 139 can have a projecting edge, which can be mated with the opening 140 within the horizontal side wall of the storage base 135. When the projecting edges of tabs such as tab 139 are mated with a corresponding opening 140 of the storage base, the container system is securely connected and moveable from one place to another by either using the handle of the storage base 135 or by attachment of handles to the platform base 131 or other mechanisms for maneuvering the entire caddy assembly in upright or inclined positions. The platform can include an integrated handle or a detachable handle, or a retractable handle that can be extended for pulling or pushing the caddy assembly. In another embodiment, the platform can include a mounting mechanism to attach the container system to a vertical surface. The mounting mechanism can be a mounting bar. In an embodiment, a handle attached to the platform base can serve as the mounting mechanism. A user can use the handle to transport the container system from one place to another, and then use the handle to mount the system on to a vertical surface such as a wall or a cabinet or a door. A person of ordinary skill in the art would understand that the customizable caddy assembly can include a plurality of container systems mated together to create a large organizational unit.

Figure 9:
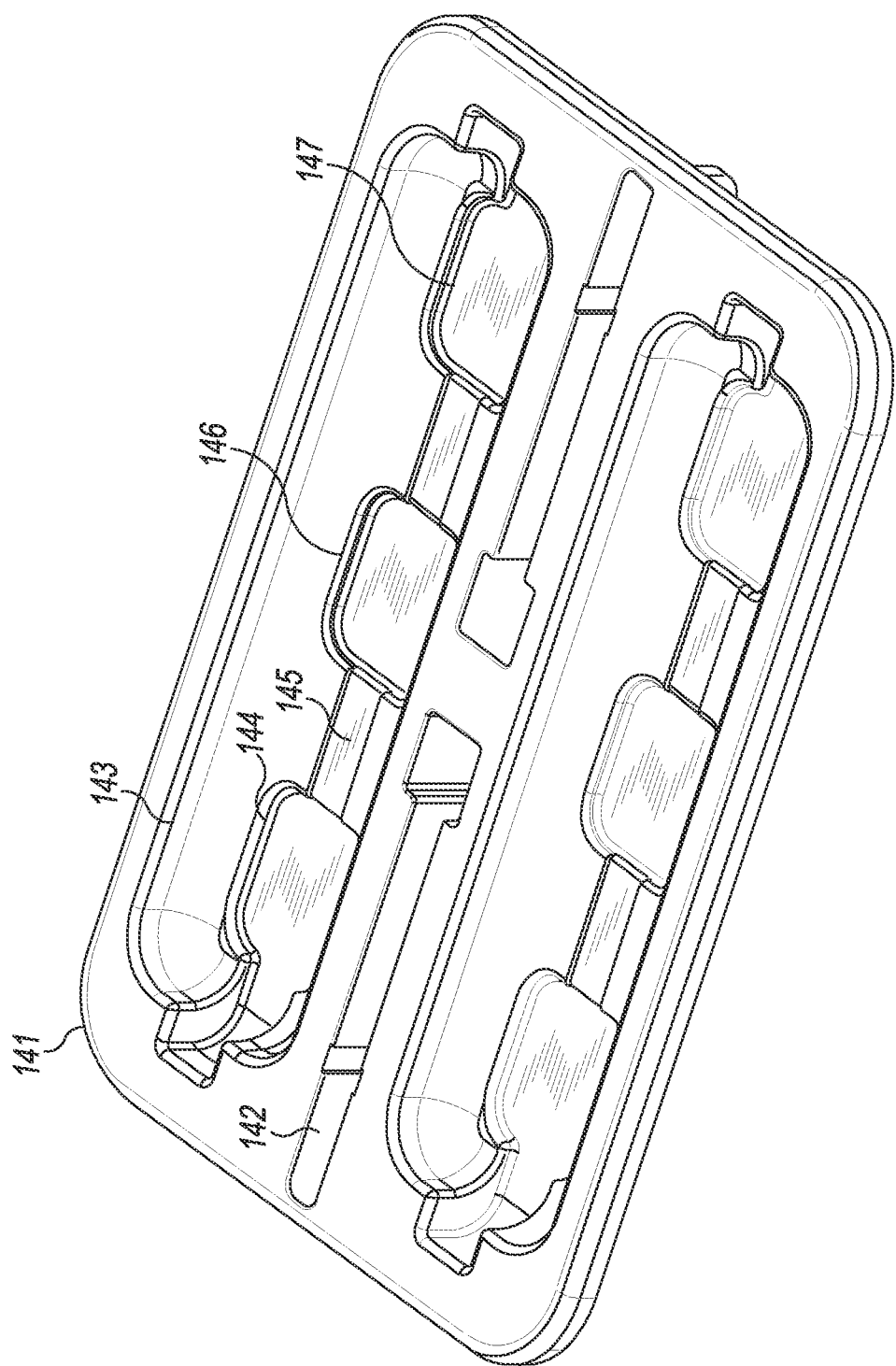
FIG. 9 is a perspective view of a platform according to an embodiment of the disclosure.

FIG. 9 is a perspective view of the top of a platform 141 according to an embodiment of the disclosure. The bottom of platform 141 has a plurality of grooves and depressions to receive the frame of a storage base. For example, the platform has grooves 143 and 144 and depressions 142, 146, and 147 to receive the frame of a storage base. In certain embodiments, grooves 143 and 144 and depressions 142, 145, and 146 removable engage the frame of a storage base through a snap-fit or other insert-slot mechanisms. Certain depressions such as 146 and 147 are designed to also accommodate the planar bottom of the receptacles. The grooves and depressions in the platform can assume various shapes known to persons of ordinary skill in the art to receive the frame of the storage base and accommodate the bottoms of the receptacles.

Figure 12:
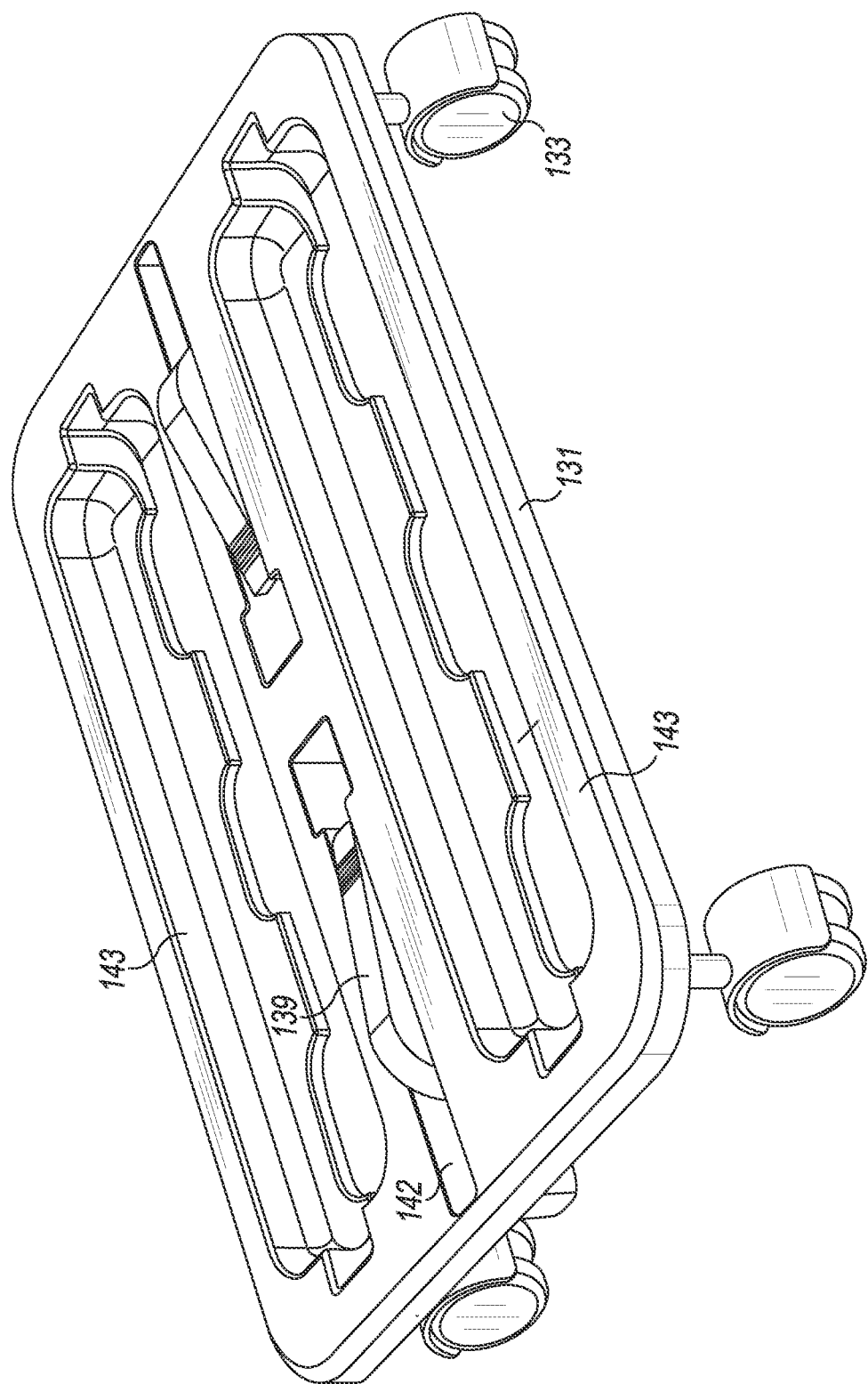
FIG. 12 is a perspective view of an embodiment of a platform with a plurality of opposing tabs in a folded down position according to this disclosure.
Figure 13:
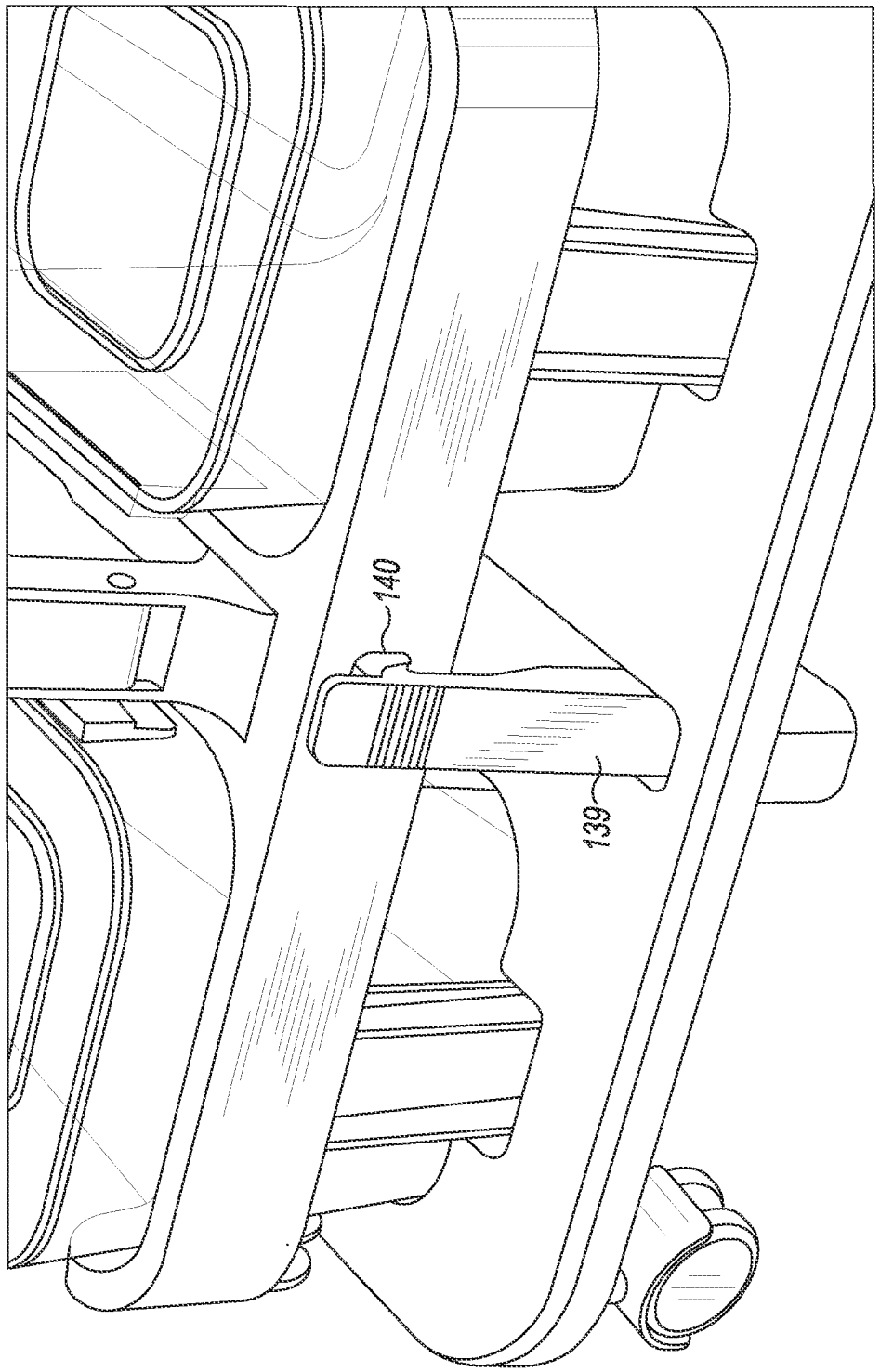
FIG. 13 is a close-up view of an embodiment of a tab pivoted into a mating position and mating with an opening of a storage base according to this disclosure.

FIG. 12 is a perspective view of an embodiment of a platform 131 with a plurality of opposing tabs 139 in a folded down position according to this disclosure. FIG. 13 is a close-up view of an embodiment of a tab 139 pivoted into a mating position and mating with an opening 140 of a storage base 135 according to this disclosure. In particular, the platform 131 defines a first longitudinal well 143 and a second longitudinal well 143 such that the first well 143 longitudinally opposes the second well 143. The platform 131 also hosts a first tab 139 including a first proximal portion and a first distal portion, where the first proximal portion is pivotally coupled to the platform 131 between the first well 143 and the second well 143 such that the first tab 139 pivots between a first lowered position (disengagement) and a first raised position (engagement) between the first well 143 and the second well 143, and where the first distal portion includes a first hook, as shown in FIG. 13. Similarly, the platform 131 hosts a second tab 139 including a second proximal portion and a second distal portion, where the second proximal portion is pivotally coupled to the platform 131 between the first well 143 and the second well 143 such that the second tab 139 pivots between a second lowered position (disengagement) and a second raised position (engagement) between the first well 143 and the second well 143, where the second distal portion includes a second hook, as shown in FIG. 13. The first tab 139 and the second tab 139 are co-aligned along a longitudinal plane common thereto, which longitudinally extends along the platform 131. As such, the first distal portion and the second distal portion are configured to move away from each other in an arcuate manner as the first proximal portion pivots from the first lowered position to the first raised position, as shown in FIG. 13, and the second tab pivots from the second lowered position to the second raised position, as shown in FIG. 13, and the first distal portion and the second distal portion are configured to move toward each other in an arcuate manner as the first proximal portion pivots from the first raised position to the first lowered position, as shown in FIG. 12, and the second proximal portion pivots from the second raised position to the second lowered position, as shown in FIG. 12. Note that as shown in FIG. 13, the first tab 139 or the second tab 139 includes a rectilinear back portion extending between a respective proximal portion and a respective distal portion. The rectilinear back portion includes a corrugated portion opposing the first hook or the second hook.

Figure 10:
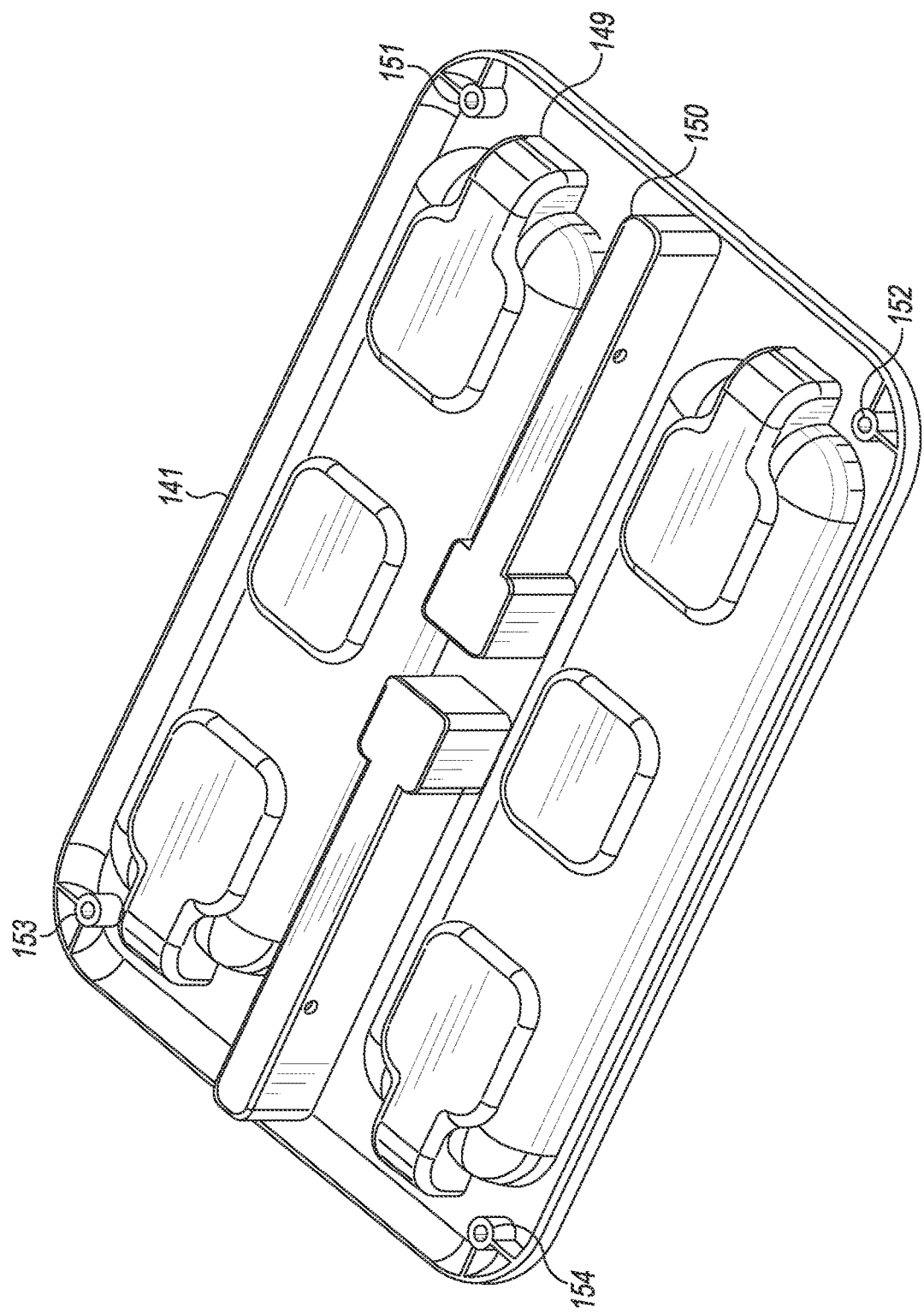
FIG. 10 is a bottom view of a platform according to an embodiment of the disclosure.

FIG. 10 is a perspective view of the bottom of a platform 141 according to an embodiment of the disclosure. The molds 149 and 150 correspond to depressions 144 and 142, as shown in FIG. 9, which are configured to receive the frame of the storage base. The slots 151, 152, 153, and 154 on the platform are configured to engage detachable moving mechanisms such as inserts with wheels. Each one of the slots 151, 152, 153, and 154 can receive an insert with a wheel, such as 132, 133, and 134 shown in FIG. 8. These wheels can have locks to prevent the platform from rolling away. Other embodiments include a platform 141 with integrated wheels instead of the detachable wheels. These wheels can be of any suitable size, shape, color, profile, width, and hardness. The wheels may be secured to the platform by a variety of mechanisms, such as screwing the wheels to appropriate slots in the platform, mounting the wheels to the platform via a bolt and a lug nut, and mounting the integrated wheels to the platform utilizing a single common axle. In an embodiment, adjacent slots such as 151 and 152 can be fitted with inline-skate wheel mechanisms, where the inserts that fit into slots 151 and 152 have a line of small wheels that increase mobility of heavier container systems. Adjacent slots such as 153 and 154 can also be similar fitted in this embodiment.

Although this disclosure refers to specific embodiments, it will be understood by those skilled in the art that various changes in form and detail may be made without departing from the subject matter set forth in the accompanying claims.

The invention claimed is:

1. A storage system comprising a first storage base and a second storage base, each of the first storage base and the second storage base comprising:
   a frame including a pair of horizontal side walls that face each other and a pair of horizontal end walls that face each other, wherein the pair of horizontal end walls extend transversely between the pair of horizontal side walls; and
   a handle including a handle base that extends from the frame and a first handle portion pivotally coupled to the handle base, the handle base including a groove formed to receive the first handle portion, and the first handle portion configured to lie flush with upper edges of the handle base when received within the groove;
   wherein at least one of the horizontal end walls of the frame includes an opening and the first handle portion has a projecting edge configured to mate with the opening in the frame; and
   wherein the projecting edge of the first handle portion of the first storage base is configured to couple with the corresponding opening formed within the frame of the second storage base to removeably couple the first storage base to the second storage base to create a storage unit that is transportable using the handle of the second storage base.

2. The storage system according to claim 1, wherein the frame of the second storage base is formed to receive the handle of the first storage base when the second storage base is coupled to the first storage base.

3. The storage system according to claim 1, wherein the first handle portion of the handle is configured to pivot about a fixed point to a substantially 90 degree angle with respect to the handle base.

4. The storage system according to claim 1, further comprising a platform including a platform base having an upper surface and a bottom surface opposite the upper surface, a plurality of wheels coupled to the bottom surface of the platform base, and a first tab pivotably coupled to the platform base; and wherein the first tab of the platform is configured to couple with the corresponding opening formed within the frame of the first storage base to removeably couple the storage unit to the platform.

5. The storage system according to claim 4, wherein the platform further includes a second tab pivotably coupled to the platform base; and wherein the second tab of the platform is configured to couple with the corresponding opening formed within the frame of the first storage base to removeably couple the storage unit to the platform.

6. The storage system according to claim 4, wherein the handle further includes a second handle portion pivotably coupled to the handle, the groove is formed to receive the second handle portion, and the second handle portion is configured to lie flush with upper edges of the handle base when received within the groove,
wherein the horizontal end walls of the frame both include openings and the second handle portion has a projecting edge configured to mate with one of the openings in the frame; and
wherein the projecting edge of the first handle portion and the projecting edge of the second handle portion of the first storage base are configured to couple with the corresponding opening formed within the frame of the second storage base to removeably couple the first storage base to the second storage base to create the storage unit.

7. The storage system according to claim 6, wherein the first handle portion is coupled to a first end of the handle base and the second handle portion is coupled to a second end of the handle base spaced apart from the first end.

8. The storage system according to claim 7, wherein the frame of the second storage base is formed to receive the handle of the first storage base when the second storage base is coupled to the first storage base.

9. The storage system according to claim 1, further comprising a plurality of removable receptacles configured to be received within at least a portion of the frame.

10. The storage system according to claim 9, wherein the frame further includes a partition wall that extends transversely between the pair of horizontal end walls to divide the frame into a first compartment and a second compartment; and wherein the plurality of removable receptacles is configured to be received in either one of the first compartment and the second compartment.

11. The storage system according to claim 10, wherein, the partition wall is formed to include an upper portion extending above the frame to form the handle.

12. The storage system according to claim 10, wherein the first compartment and the second compartment are formed to receive the handle of the first storage base when the second storage base is coupled to the first storage base.

13. A storage system comprising a first storage base and a second storage base, each of the first storage base and the second storage base comprising:
a frame; and
a handle including a handle base that extends outward from the frame and at least one handle portion pivotally coupled to the handle, the handle base including a groove formed to receive the at least one handle portion, and the at least one handle portion configured to lie flush with upper edges of the handle base when received within the groove;
wherein the frame includes an opening and the at least one handle portion is configured to mate with the opening formed in the frame; and
wherein the at least one handle portion of the first storage base is configured to couple with the corresponding opening formed within the frame of the second storage base to removeably couple the first storage base to the second storage base to create a storage unit that is transportable using the handle of the second storage base.

14. The storage system according to claim 13, wherein the frame of the second storage base is formed to receive the handle of the first storage base when the second storage base is coupled to the first storage base.

15. The storage system according to claim 13, further comprising a platform including a platform base having an upper surface and a bottom surface opposite the upper surface, a plurality of wheels coupled to the bottom surface of the platform base, and a first tab pivotably coupled to the platform base; and wherein the first tab of the platform is configured to couple with the corresponding opening formed within the frame of the first storage base to removeably couple the storage unit to the platform.

16. The storage system according to claim 13, wherein the frame includes a pair of horizontal side walls that face each other and a pair of horizontal end walls that face each other, wherein the pair of horizontal end walls extend transversely between the pair of horizontal side walls; and
wherein at least one of the horizontal end walls of the frame includes an opening and the at least one handle portion has a projecting edge configured to mate with the opening formed in the frame.

17. The storage system according to claim 16, wherein the handle further includes a two handle portions pivotally coupled to the handle at opposite ends of the handle, the groove is formed to receive the two handle portions, and the two handle portions are configured to lie flush with upper edges of the handle base when received within the groove,
wherein the horizontal end walls of the frame both include openings and each of the two handle portions has a projecting edge configured to mate with one of the openings formed in the frame; and
wherein the projecting edges of the two handle portions of the first storage base are configured to couple with the corresponding opening formed within the frame of the second storage base to removeably couple the first storage base to the second storage base to create the storage unit.

18. The storage system according to claim 17, wherein the frame of the second storage base is formed to receive the handle of the first storage base when the second storage base is coupled to the first storage base.

19. The storage system according to claim 13, further comprising a plurality of removable receptacles configured to be received within at least a portion of the frame;

wherein the frame further includes a partition wall that extends transversely between the pair of horizontal end walls to divide the frame into a first compartment and a second compartment; and wherein the plurality of removable receptacles is configured to be received in either one of the first compartment and the second compartment.

20. The storage system according to claim 19, wherein, the partition wall is formed to include an upper portion extending above the frame to form the handle; and wherein the first compartment and the second compartment are formed to receive the handle of the first storage base when the second storage base is coupled to the first storage base.

\* \* \* \* \*